United States Patent [19]
Lee et al.

[11] Patent Number: 5,619,269
[45] Date of Patent: Apr. 8, 1997

[54] FRAME SYNC SIGNAL FOR DIGITAL TRANSMISSION SYSTEM

[75] Inventors: Ronald B. Lee, Northbrook; Larry E. Nielsen, Chicago, both of Ill.

[73] Assignee: Zenith Electronics Corporation, Glenview, Ill.

[21] Appl. No.: 481,664

[22] Filed: Jun. 7, 1995

[51] Int. Cl.$^6$ .................................................. H04N 7/24
[52] U.S. Cl. .......................................... 348/432; 348/495
[58] Field of Search ............................ 348/21, 471, 472, 348/429, 426, 427, 432, 474, 495, 470; 325/265, 286, 296, 346, 348, 357; H04N 7/24

[56] References Cited

U.S. PATENT DOCUMENTS

| | | | |
|---|---|---|---|
| 5,040,063 | 8/1991 | Citta et al. | 348/21 |
| 5,063,446 | 11/1991 | Gibson | 348/486 |
| 5,416,524 | 5/1995 | Citta et al. | 348/495 |
| 5,438,369 | 8/1995 | Citta et al. | 348/21 |
| 5,512,957 | 4/1996 | Hulyalkar | 348/21 |

*Primary Examiner*—Victor R. Kostak

[57] ABSTRACT

An ATV signal includes a field sync reference having a relatively long pseudo-random number symbol sequence followed by three relatively short pseudo-random number symbol sequences, with the middle of the three short pseudo-random number symbol sequences having inverted polarity in alternate fields.

15 Claims, 4 Drawing Sheets

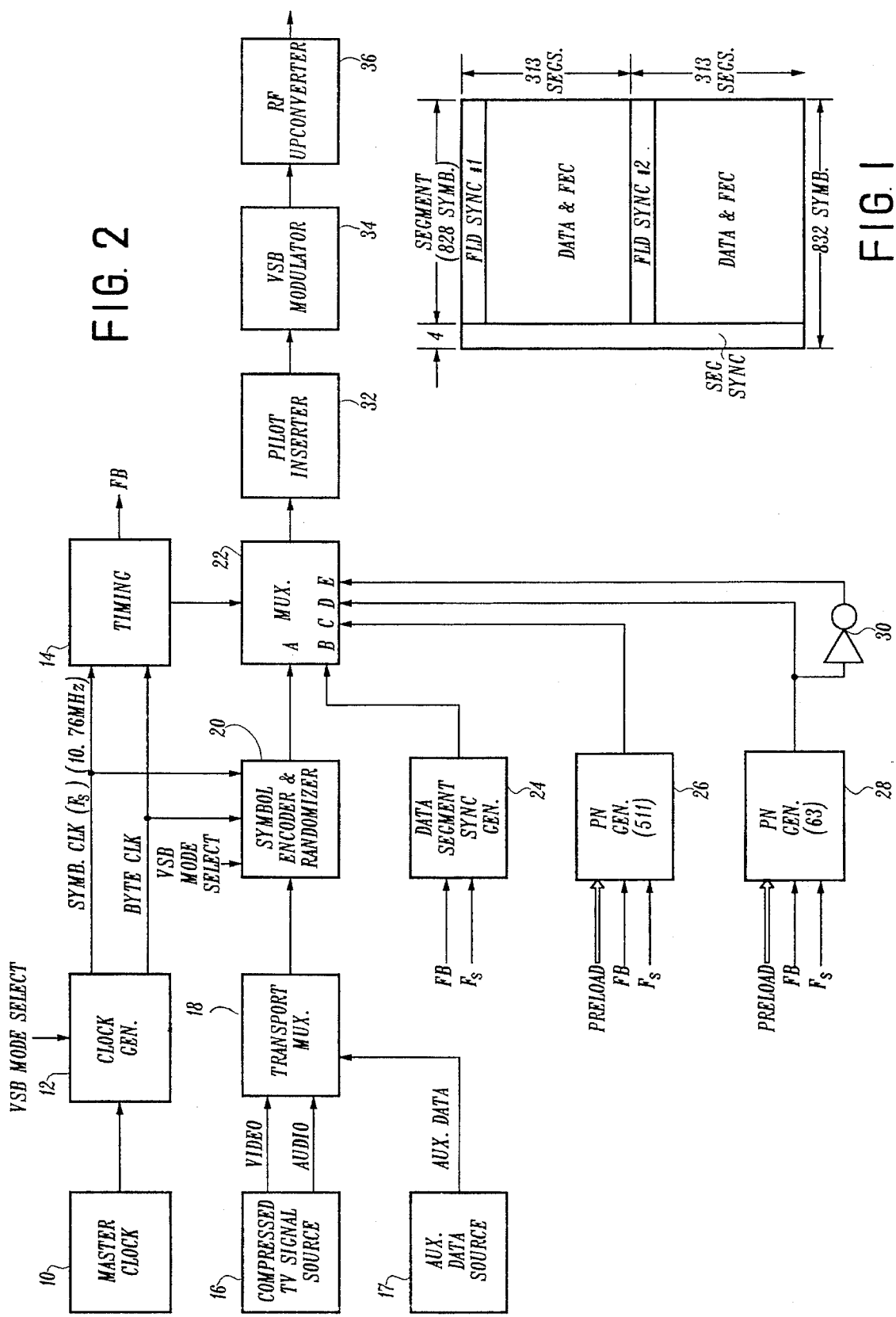

63 PN SEQUENCE, $X^6 + X + 1$
(PRELOAD 100111)

511 PN SEQUENCE,
$X^9 + X^7 + X^6 + X^4 + X^3 + X + 1$
(PRELOAD 010000000)

FRAME SYNC SIGNAL FOR DIGITAL TRANSMISSION SYSTEM

BACKGROUND OF THE INVENTION AND PRIOR ART

This invention relates to digital transmission systems for transmitting digital data over a variety of media. In particular, the invention relates to a VSB (vestigial sideband) digital transmission system suitable for ATV (advanced television) signals transmitted over NTSC channels including currently unusable or "taboo" NTSC channels. The ATV signal is a digital television signal which may represent a high resolution high definition television signal (HDTV) or several lower resolution images or other digital information. The lower resolution ATV signals require a lower bit rate so that several such signals may be included in one channel band. A high data rate cable mode supports two or more ATV signals in one 6 MHz channel, depending upon their resolution, whereas a lower data rate, but more robust, terrestrial mode supports one or more ATV signals in one 6 MHz channel (again depending upon resolution) with minimal interference to or from NTSC channel signals. It will be appreciated that the invention is equally applicable to a data only modem and is not restricted to television systems.

The VSB transmissions system comprises a series of data frames organized into a plurality of data segments of 832 symbols each. Each data frame has a first data field sync segment, followed by 312 data segments, and a second data field sync segment followed by another 312 data segments. Each data segment consists of a four symbol data segment sync, each symbol comprising two levels, followed by 828 data and FEC (forward error correction) symbols. The error correction consists of R-S (Reed-Solomon) parity bytes.

The symbol rate is 4.5/286 MHz×684 which is approximately 10.76 MHz. The first term, 4.5/286, is the NTSC horizontal scan rate. All transmitted signals are multilevel. The sync symbols are always 2 level (binary). In the terrestrial or broadcast mode, 8 level symbols, which are trellis coded to represent 2 information bits per symbol, are transmitted and each segment corresponds to one R-S correction block of 207 bytes or 1656 bits per segment. In the high data rate cable mode, 16 level symbols (4 bits per symbol) may be used and in that event, each segment corresponds to two R-S correction blocks of 207 bytes which yields 3312 bits per segment. These are referred to as trellis coded 8-VSB for the terrestrial mode and 16-VSB for the cable mode. Of course, lower level VSB (2, 4 and 8-non trellis VSB) may also be used for the cable mode.

The transmission is via suppressed carrier modulation. Three hundred and ten kilohertz from the lower band edge, a small DC pilot is added to the signal for use by the VSB receiver to facilitate carrier lock. All payload data is randomized to insure that random data is transmitted even when constant data is being supplied to the system. The data and FEC bytes are interleaved for added protection against burst errors.

In accordance with the present invention, the field sync signal is characterized by a relatively long pseudo-random number sequence followed by three relatively short pseudo-random number sequences with the middle of the short pseudo-random number sequences alternating in polarity in alternate fields. In a preferred embodiment, the relatively long pseudo-random number sequence is used as an equalizer training signal in terrestrial broadcast applications and one, of the relatively short pseudo-random number sequences is used as an equalizer training signal in more benign applications, such as in a cable environment. Equalizers using the shorter sequences require less hardware complexity.

OBJECTS OF THE INVENTION

A principal object of the invention is to provide an improved ATV transmission and reception system.

Another object of the invention is to provide a novel field sync signal for use in a digital transmission system.

A further object of the invention is to provide an ATV signal with a reliable reference signal for use by an adaptive equalizer.

BRIEF DESCRIPTION OF THE DRAWINGS

These and other objects and advantages of the invention will be apparent upon reading the following description in conjunction with the drawings, in which:

FIG. 1 depicts a data frame of an ATV signal formatted in accordance with the invention;

FIG. 2 is a simplified block diagram of a transmitter for transmitting the ATV signal of the invention;

DESCRIPTION OF THE PREFERRED EMBODIMENT

Figure 3:
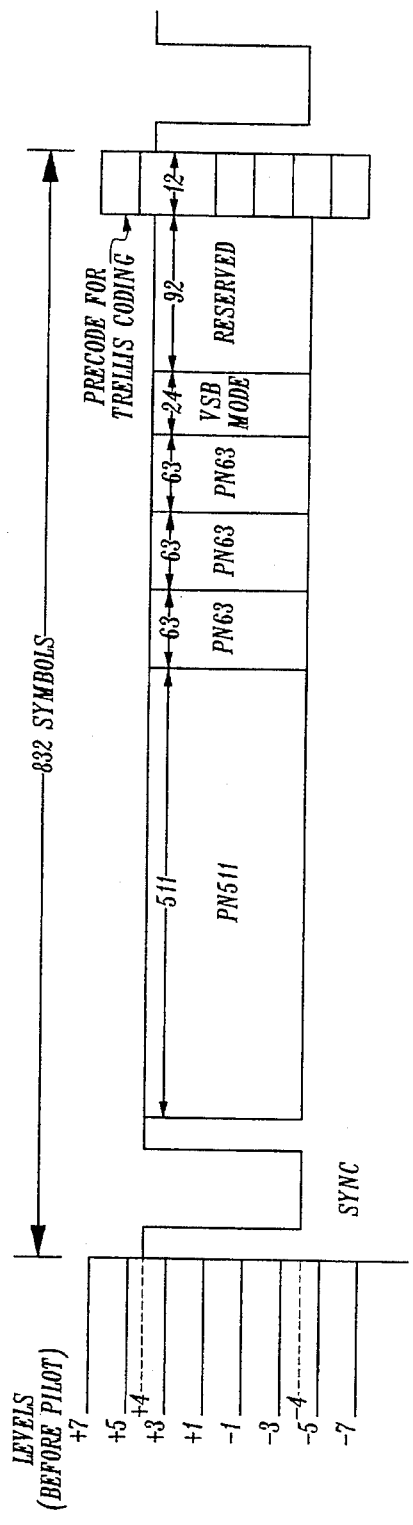
FIG. 3 is an illustration showing the format of the synchronizing signal segment of the ATV signal of the invention.

Referring to FIG. 1, a frame arranged in accordance with the invention includes two fields of 313 segments each with the first segment of each field comprising a field sync. Additionally, each segment includes 828 data symbols plus an additional 4 symbols corresponding to a segment sync signal at the beginning of each segment. As indicated, the field syncs are different. There is a field sync #1 and a field sync #2 with the remaining 312 segments of each field comprising data plus FEC (forward error correction). Overall, each data segment comprises 832 data symbols including 4 data segment sync symbols. The amount of data (bytes) per frame will, of course, depend upon the VSB rate, i.e. the number of bits per symbol.

In FIG. 2, a transmitter for developing an ATV signal in accordance with the format of FIG. 1 is shown. A master clock 10 of about 75 MHz, which is preferably crystal controlled, supplies a clock generator 12 that is also controlled by a VSB mode select signal to generate a symbol clock ($F_s$) and a byte clock. The symbol clock is constant at approximately 10.76 MHz whereas the byte clock is a function of the VSB mode select signal, which defines the number of symbol levels used to encode the data. For example, in a high VSB mode, such as 16-VSB (16 level symbols), the byte clock will be relatively high (i.e., 5.38 MHz), whereas in a low VSB mode, such as 2-VSB, the byte clock is relatively low (i.e., 1.34 MHz). The symbol clock and the byte clock outputs are supplied to a timing circuit 14 which develops timing signals for the transmitter, including a signal FB in time coincidence with the field sync signals. A compressed TV signal source 16 supplies packetized elementary streams (PES) of video and audio signals and an auxiliary data source supplies auxiliary data to a transport multiplexer 18 which develops a multiplexed transport stream of fixed length video, audio and auxiliary data packets for application to a symbol encoder and randomizer 20, which is also supplied with the VSB mode select, the byte clock and the symbol clock signals. While only one video PES, one audio PES and one source of auxiliary data are shown being applied to transport multiplexer 18, it will be understood that more than one of each of these signals may be applied to the multiplexer. The symbol encoder 20, which preferably also includes a convolutional interleaver and an R-S encoder, supplies the A input of a multiplexer 22 which is controlled by timing signals from timing block 14. A data segment sync generator 24 supplies the B input of multiplexer 22. A first relatively long pseudo-random number generator 26 supplies the C input of multiplexer 22 and a second relatively short pseudo-random number generator 28 supplies the D input of multiplexer 22, as well as the E input via an inverter 30. The data segment sync generator 24, the relatively long pseudo-random number generator 26 and the relatively short pseudo-random number generator 28 are also supplied with FB and $F_s$ input signals, the FB signal being a frame blanking signal and the $F_s$ signal being the symbol clock. Additionally, the pseudo-random number generators 26 and 28 are supplied with specific preloads for generating the pseudo-random number sequences. The frame blanking signal FB is supplied from timing block 14. The output of multiplexer 22 is fed to a pilot inserter 32 where a pilot signal (in the form of a preselected DC offset level) is added to the signal for transmission. The output of pilot inserter 32 is supplied to a VSB modulator 34 where the signal is modulated in a vestigial sideband manner and supplied to an RF upconverter 36 for transmission.

In FIG. 3, the general makeup of the field sync signal is shown. The level of the signal is indicated at the left for exemplary mode VSB=8. These levels are before the addition of the pilot signal (DC offset) and the data levels are seen to range from −7 to +7. The sync levels are between the data levels, specifically at +4 and −4. Multiplexer 22 (FIG. 2) is operated to construct the segment, which as mentioned previously, comprises 832 symbols, such that the first four symbols comprise data segment sync. The relatively long 511 symbol sequence occurs next followed by the three relatively short sequences of 63 symbols each, the middle 63 symbol sequence being alternated in polarity in alternate fields. A 24 symbol VSB mode signal is included after the last 63 symbol sequence followed by a 92 symbol block that is reserved for other uses. The final 12 symbols comprise a precode for the trellis coding which is used in the terrestrial mode as discussed in application Ser. No. 08/272,357, filed Jul. 8, 1994 (these 12 Symbols are reserved in non-terrestrial applications).

Figure 4:
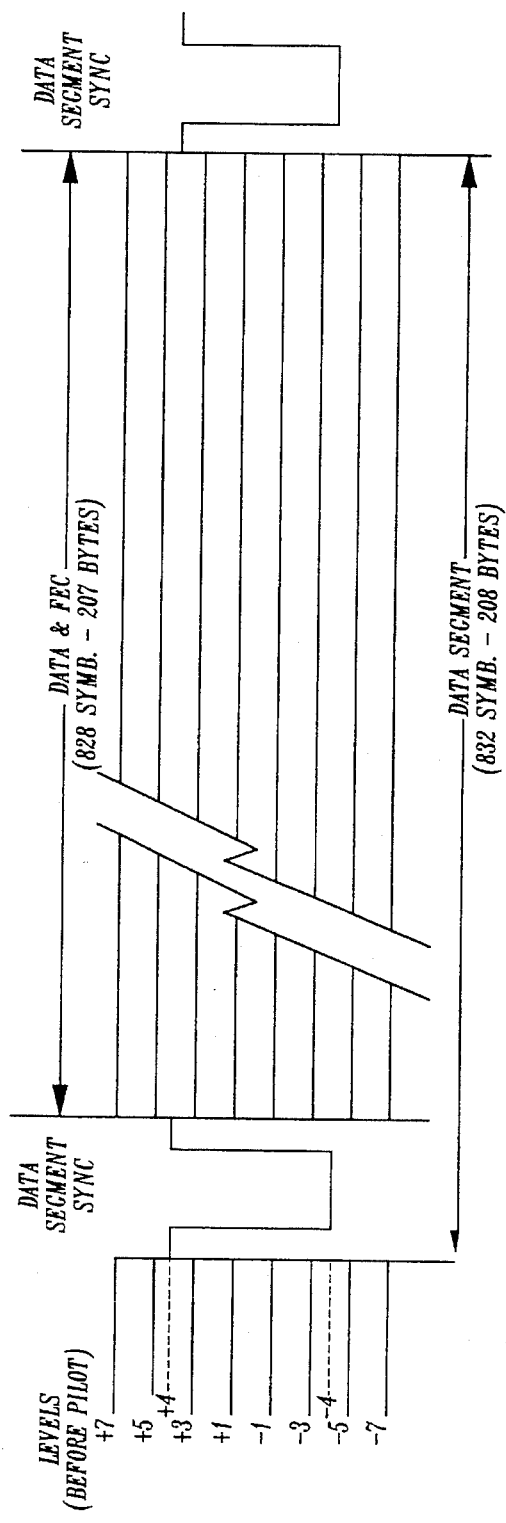
FIG. 4 depicts the remaining data segments of the field.

In FIG. 4, the remaining segments of the field are shown. They are seen to consist of data and FEC and comprise 828 symbols (207 bytes for exemplary mode VSB=8) plus the four symbols for data segment sync.

Figure 5:
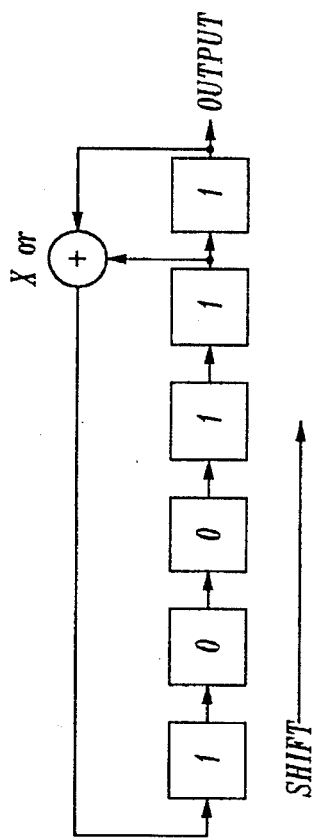
FIG. 5 illustrates an arrangement for developing the short pseudo-random number sequences.

In FIG. 5, the pseudo-random sequence generator for generating the relatively short (63) pseudo-random sequence is shown. It consists of a six stage shift register plus an exclusive OR gate arrangement between the fifth and sixth stages supplying an output to the first stage with a preload sequence of 100111.

Figure 6:
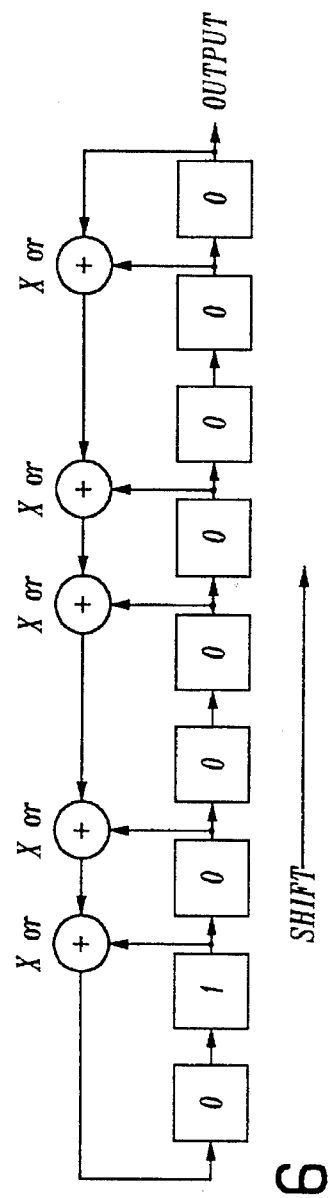
FIG. 6 illustrates an arrangement for developing the relatively long pseudo-random number sequence.

In FIG. 6, a similar arrangement is shown for the 511 or relatively long pseudo-random sequence generator which has a preload sequence of 010000000. These sequences were selected to minimize RMS errors in auto correlation.

Figure 7:
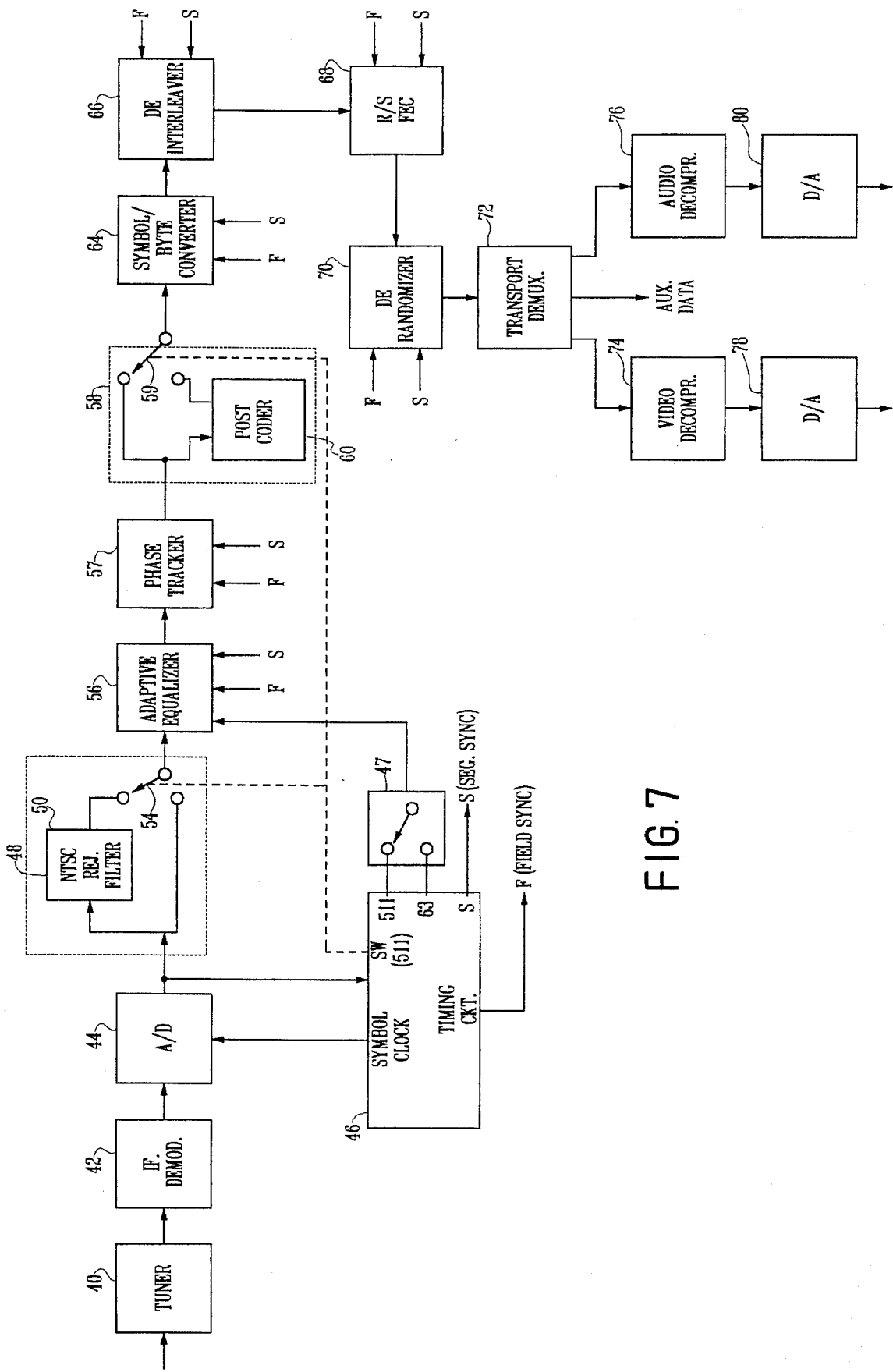
FIG. 7 is a simplified block diagram of a receiver for receiving the ATV signal of the invention.

FIG. 7 illustrates a receiver for receiving the ATV signal. A tuner 40 receives the signal and supplies it to an IF-demodulator 42 where the received multilevel signal is demodulated in a conventional manner. IF-demodulator 42 is coupled to an A/D converter 44 which in turn is coupled to a dotted line block 48 that includes an NTSC rejection filter 50 and a switch 54. Operation of switch 54 selectively incorporates NTSC rejection filter 50 in the signal path or bypasses the NTSC rejection filter 50. The output of the dotted line block 48 is coupled to an equalizer 56, the output of which is applied to a phase tracker 57 (see, for example, U.S. Pat. No. 5,406,587) and coupled to a dashed line block 58 that, responsive to operation of a switch 59, selectively inserts a post coder filter 60 in the signal path, or bypasses the signal around the post coder filter 60. The operation of switches 54 and 59 is coordinated so that the signal path includes either filter 50 or post coder 60, but not both. Filter 50 and post coder 60 are used in terrestrial applications but are not required where the transmission medium is a cable or the like which does not experience substantial NTSC co-channel interference. The output of block 58 is coupled to a symbol to byte converter 64. The symbol to byte converter 64 converts the received symbols into corresponding digital data in byte form and supplies it to a deinterleaver 66 which, in turn, supplies a Reed-Solomon FEC circuit 68 that outputs a signal to a derandomizer 70. The output of derandomizer 70 is coupled to a transport demultiplexer 72 that has three outputs, one output supplying a packetized elementary video stream to a video decompression circuit 74, which feeds a D/A converter 78, another output supplying a packetized elementary audio stream to an audio decompression circuit 76 that feeds a D/A converter 80 and an output for auxiliary data. The output of A/D 44 is also supplied to a timing circuit 46 which develops various timing signals, including a symbol clock for controlling A/D 44, a field sync F and a segment sync S. Timing Circuit 46 also develops a pair of control signals corresponding to the pseudo-random number sequences of 511 and 63 symbols, respectively, shown in FIG. 3. Additionally, timing circuit 46 is responsive to the received relatively long (511) pseudo-random number sequence for generating a switch control signal for controlling switches 54 and 59 via the dashed interconnecting lines. Either the relatively long (511) or the relatively short (63) pseudo-random number sequence (or a selected portion of either) may be used by equalizer 56 as a reference or training signal for ghost cancellation depending upon the environment in which the receiver is used. In a cable environment, the relatively short pseudo-random sequence is preferably used for controlling the equalizer since it results in a more cost effective equalizer. Because of the relatively benign environment of the cable system, the shorter sequence is sufficient for cancelling the short ghosts that may be encountered. Also, the middle one of the 63 symbol sequences is preferably used as the training signal because any static distortions (such as long ghosts or non linearities) resulting from adjacent fixed PN sequences will appear to alternate in polarity in successive fields, whereby such distortions will have a minimal effect on the operation of the equalizer.

In a terrestrial environment, the relatively long (511) pseudo-random sequence may be used for controlling equalizer 56 since the channel must be equalized for both long and short signal ghosts. The field sync F and the segment sync S signals are used to control the phase tracker 57, the symbol/byte converter 64, the deinterleaver 66, the R-S FEC circuit 68 and the derandomizer 70. Additionally, phase tracker 57 is responsive to selective portions of the field sync symbols for controlling its operation as disclosed in U.S. Pat. No. 5,406,587. Also, in either the cable or terrestrial environments, alternating the polarity of the middle relatively short pseudo-random sequence facilitates DC offset cancellation in the equalizer as disclosed in U.S. Pat. No. 5,060,067.

What has been described is a novel field sync signal for a digital transmission system which is particularly useful for controlling an adaptive equalizer in both cable and terrestrial television broadcast applications. Specifically, the reversal of polarity in alternate fields of the middle pseudo-random number sequence facilitates equalizer operation in the cable application. It is recognized that numerous changes in the described embodiment of the invention Will be apparent to those skilled in the art without departing from its true spirit and scope. The invention is to be limited only as defined in the claims.

What is claimed is:

1. A method of operating a digital transmission system comprising:

formatting a signal having a plurality of segments of multilevel symbols arranged in frames of two fields with each field having a field sync segment and each segment having a segment sync;

generating a first symbol sequence;

generating a second symbol sequence that is shorter than the first symbol sequence;

multiplexing the segment sync and the first and the second symbol sequences to form a field sync segment; and alternating the polarity of the second symbol sequence in successive fields of the frames.

2. The method of claim 1 further comprising:

generating third and fourth symbol sequences shorter than the first symbol sequence; and multiplexing the third and fourth symbol sequences in the field sync segment before and after the second symbol sequence.

3. The method of claim 1, further comprising operating an NTSC rejection filter in response to at least a portion of the field sync segment.

4. The method of claim 1 further comprising operating an NTSC rejection filter in response to at least a portion of said first symbol sequence.

5. A method of operating a digital transmission system comprising:

formatting a signal having a plurality of segments of multilevel symbols arranged in frames of two fields with each field having a field sync segment and each segment having a segment sync;

generating a first symbol sequence;

generating a second symbol sequence that is shorter than the first symbol sequence; and combining the segment sync and the first and second symbol sequences to form a field sync segment in which the first sequence is followed by three of the second sequences, the polarity of the middle one of the three second sequences being inverted in alternate fields.

6. The method of claim 5 wherein the first symbol sequence comprises a 511 symbol pseudo-random sequence and the second symbol sequence comprises a 63 symbol pseudo-random sequence.

7. The method of claim 5 further comprising operating an NTSC rejection filter in response to at least a portion of the field sync segment.

8. The method of claim 5 further comprising operating an NTSC rejection filter in response to at least a portion of the first symbol sequence.

9. A method of operating a receiver comprising:

receiving a digital data signal having a plurality of segments of multilevel symbols arranged in frames of two fields with each field having a field sync segment comprising a first symbol sequence and a second symbol sequence that is shorter than the first symbol sequence and whose polarity is inverted in alternate fields, each segment having a segment sync, the method comprising:

applying the field sync segment to an equalizer; and operating the equalizer in response to the applied field sync segment to cancel linear distortions characterizing the received digital data signal.

10. The method of claim 9 wherein the digital data signal includes a third and a fourth symbol sequence that is shorter than the first symbol sequence and sandwiching the second symbol sequence, the polarity of which is inverted in alternate fields.

11. The method of claim 10 wherein the symbol sequences are pseudo-random number sequences.

12. A method of operating a digital transmission system comprising:

formatting a signal having a plurality of segments of multilevel symbols arranged in frames of two fields with each field having a field sync segment and each segment having a segment sync;

generating a 511 pseudo-random number symbol sequence;

generating three 63 pseudo-random number symbol sequences, with the middle 63 symbol sequence being inverted in polarity in alternating fields;

multiplexing the 511 and three 63 pseudo-random symbol sequences to generate a field sync signal;

deriving an equalizer control signal in response to at least a portion of the field sync signal.

13. The method of claim 12 wherein the equalizer control signal is derived in response to the 511 symbol sequence.

14. The method of claim 12 wherein the equalizer control signal is derived in response to at least a portion of the three 63 pseudo-random number symbol sequences.

15. The method of claim 14 wherein the equalizer control signal is derived in response to the middle one of the three 63 pseudo-random number symbol sequences.

* * * * *